United States Patent Office 3,485,805
Patented Dec. 23, 1969

3,485,805
N-ALKYL SUBSTITUTED POLYAMIDE
ELASTOMERS
Clifton Douglas Cowell, Panteg, and Geoffrey James Tyler, Llantarnam, Cwmbran, England, assignors to British Nylon Spinners Limited, Pontypool, Monmouthshire, England, a corporation of Great Britain
No Drawing. Filed Nov. 10, 1965, Ser. No. 507,244
Claims priority, application Great Britain, Nov. 21, 1964, 47,477/64, 47,478/64
Int. Cl. C08g 20/20
U.S. Cl. 260—78    7 Claims

ABSTRACT OF THE DISCLOSURE

A process for the manufacture of N-substituted copolyamide elastomers capable of being spun, conveniently by a melt-spinning process, into filaments, which comprises bringing about by the application of heat and usually in the presence of a polymerization catalyst, an interaction between a lactam of an amino-carboxylic acid, an N- mono-substituted or an N,N-disubstituted aliphatic diamine and an aliphatic alpha, omega dicarboxylic acid containing at least five carbon atoms in the chain, which diamine and dicarboxylic acid may be in the form of a salt thereof, the reactants being brought together in such proportions and in such a manner that the degree of N-substitution in the resultant polyamide is 10 to 34 percent.

The N-substituted copolyamides and the filaments which can be obtained therefrom are constituted of segments consisting of a low molecular weight polyamide derived from the lactam of an amino-carboxylic acid which if fully polymerized so as to constitute a fiber-forming homopolymer, would possess a relatively high melting point, and segments consisting of a low molecular weight polyamide derived from the polycondensation of the substituted aliphatic diamine with the aliphatic alpha, omega dicarboxylic acid, which if fully polymerized to give a fiber-forming homopolymer would possess a relatively low melting point.

DISCLOSURE

This invention relates to a process for the manufacture of synthetic elastomers and to the elastomers so manufactured and more particularly to the manufacture of N-substituted copolyamides of a specified degree of N-substitution, to the N-substituted copolyamides so manufactured and to filaments obtained therefrom.

The linear polyamides synthesised by heating together substantially equimolecular proportions of a diamine and a dibasic acid, by way of examples of which there may be cited hexamethylene diamine and adipic acid, are normally high melting-point, crystalline compounds insoluble in the usual solvents. The high degree of crystallinity possessed by such polyamides has been attributed (see, for instance, the article of Biggs, Frosch and Erickson in Industrial and Engineering Chemistry, vol. 38, No. 10) to the well developed polar co-ordination through hydrogen bonding which is present in those compounds. Certainly, it is known that progressive replacement of the hydrogen atoms of the amide groups of polyamides by hydrocarbon groups results in a modification of the properties originally possessed by the polyamides. In particular, there is an increase in the flexibility of the polymer, which is found, at a certain degree of substitution of the amidehydrogen atoms (referred to at several passages herein as the degree of substitution), to possess a rubber-like elasticity. However, as is explained in the aforementioned article, the increased flexibility is obtained at the expense of certain other properties such as water sensitivity, general chemical stability particularly towards the ordinary solvents and softening point which tend to be adversely affected by increasing degrees of N-substituiton.

In the search for a synthetic elastomeric material from which there could be derived elastic filaments, attention was given during the 1940's and early 1950's to the N-substituted polyamides, on account of the rubber-like flexibility which, as previously explained herein, they were known to possess at an appropriate degree of N-substitution. However, despite considerable research effort towards this end, as evinced by a number of publications now available, the N-substituted polyamides have not, so far as we have been able to ascertain, attained any significant importance in the making of elastic filaments. Certainly, they have not attained an importance commensurate with the potential attractiveness of the materials in that role which, together with the lack of success in the exploitation thereof, is commented on at page 397 in the 4th edition of "Man-Made Fibres" by R. W. Moncrieff, published by Heywood and Company Limited, in London in 1963.

No doubt the reasons for the past failure of the N-substituted polyamides in this particular application are various and complex, but we suggest than an important factor detracting from the utility of the N-substituted polyamides as elastic filaments was the reduced softening point and enhanced water sensitivity and solubility in the common solvents then obtaining as a consequence of the degree of N-substitution considered necessary to confer useful elastomeric properties on the filaments. The properties of softening point chemical stability toward solvent action and hydrolytic stability, the latter being a reflection of the water sensitivity, are critical in relation to the use of the filaments in textile fabrics on account of the ability required of such fabrics to withstand repeated washing and ironing, as well as associated operations such as bleaching and dry-cleaning.

By way of illustrating what is taught in prior art regarding the correlation between the degree of N-substitution and elastomeric character, we direct attention to an article by W. H. Charch and J. C. Shivers entitled "Elastomeric Condensation Block Copolymers" which is to be found at pages 536–540 in the Textile Research Journal for July 1959 and which at pages 536–537 describes N-substituted polyamides of varying degrees of N-substitution prepared by reaction of sebacic acid with different ratios of hexamethylene diamine, N-isobutylhexamethylene diamine and N,N' - diisobutylhexamethylene - diamine. The graph which is reproduced as Figure 1 in that article and which shows the changes which occur through progressive substitution of the amido hydrogen atoms from 0 to 100 percent, identifies the N-substituted polyamides possessing elastomeric character as those in which 40 to 64 percent of the amide hydrogens are so substituted.

In the specification of our co-pending application No. 447,553, filed Apr. 12, 1965, now abandoned, we have demonstrated, that, contrary to the teaching of the prior art, useful elastomeric character can be manifest by particular N-substituted polyamides at degrees of N-substitution of less than 40 percent, and have described a process for making these polyamides which involves interacting, in the molar ratios appropriate for the attainment of the desired degree of N-substitution, which is in the range between 15 and 34 percent, a lactam of an amino-carboxylic acid with an N-substituted omega-amino carboxylic acid having at least seven carbon atoms. The specification of the aforementioned application further describes the melt-spinning of the novel N-substituted polyamides into elastic filaments which possess, primarily on account of the low degrees of N-substitution, a combination of advantageous properties.

It has now been found that useful elastomeric properties are possessed by N-substituted copolyamides derived from the interaction of a lactam of an amino-carboxylic acid with an N-amino or an N,N'-disubstituted aliphatic diamine and an aliphatic alpha, omega-dicarboxylic acid containing at least five carbon atoms in the chain, provided the reactants are brought together in amounts such that the degree of N-substitution in the resultant polyamide is 10 to 34 percent. In place of the mixture of the diamine and dicarboxylic acid, there may conveniently be employed the chemically equivalent diamine-dicarboxylic acid salt derived therefrom.

Accordingly, the present invention when considered from one of its aspects provides a process for the manufacture of N-substituted copolyamide elastomers capable of being spun, conveniently by a melt-spinning process, into filaments, which comprises bringing about by the application of heat and usually in the presence of a polymerisation catalyst, an interaction between a lactam of an amino-carboxylic acid, an N- mono-substituted or an N,N'-disubstituted aliphatic diamine and an aliphatic alpha, omega dicarboxylic acid containing at least five carbon atoms in the chain, which diamine and dicarboxylic acid may be in the form of a salt thereof, the reactants being brought together in such proportions and in such a manner that the degree of N-substitution in the resultant polyamide is 10 to 34 percent.

The N-substituted copolyamides and the filaments which can be obtained therefrom are constituted of segments consisting of a low molecular weight polyamide derived from the lactam of an amino-carboxylic acid which, if fully polymerised so as to constitute a fibre-forming homopolymer, would possess a relatively high melting point, and segments consisting of a low molecular weight polyamide derived from the polycondensation of the substituted aliphatic diamine derived from the polycondensation of the substituted aliphatic diamine with the aliphatic alpha, omega dicarboxylic acid, which if fully polymerised to give a fibre-forming homopolymer would possess a relatively low melting point.

In this specification and in the claiming clauses appended hereto, the former segments will be referred to as hard segments and the latter as soft segments and when such terms appear they are to be construed in the light of the above remarks which constitute definitions thereof.

To endow the N-substituted copolyamides and the filaments with the desired elastomeric properties it is necessary that the substituted aliphatic diamine component of the soft segments of the copolyamide should be present in an amount such that 10 to 34 percent of the amide hydrogen atoms in the copolyamide are substituted with hydrocarbon, or substituted hydrocarbon groups.

In the event that a N-mono-substituted aliphatic diamine, that is a secondary-primary aliphatic diamine having the formula RNHXNHR', where R is hydrocarbon or substituted hydrocarbon group and X is divalent radical and preferably a divalent alkylene radical having six or more carbon atoms, is utilised in the manufacture of the N-substituted copolyamides, the development of the most advantageous elastomeric character, and textile properties in the filaments spun therefrom, is associated with a degree of N-substitution of 10 to 20 percent. Degrees of N-substitution of this order are attained when the reactants are brought together in such amounts that the molar ratio of the three components (diamine, dicarboxylic acid and lactam) lies within the range of 0.25:0.25:1 to 0.33:0.33:1 n those instances in which the copolyamide is prepared by the reaction of the lactam with the separately prepared diamine-dicarboxylic acid salt, the molar ratio of the reactants (salt: lactam) to provide the aforementioned desired degree of N-substitution must lie within the range of 0.25:1 to 0.33:1.

In the event that an N,N'-disubstituted aliphatic diamine, that is a disecondary aliphatic diamine is utilised in the manufacture of the N-substituted copolyamides, the development of the most advantageous elastomeric character and textile properties in the filaments spun therefrom, is associated with a degree of N-substitution of 15 to 33⅓ percent. Degrees of N-substitution of this order are attained when the reactants are brought together in such amounts that the molar ratio of the three components (diamine, dicarboxylic acid and lactam) lies within the range of 0.088:0.088:1 to 0.25:0.25:1. In those instances in which the copolyamide is prepared by the reaction of the lactam with the separately prepared diamine-dicarboxylic acid salt, the molar ratio of the reactants (salt:lactam) to provide this desired degree of N-substitution must lie in the range of 0.088:1 to 0.25:1.

From the copolyamides of this invention having a degree of N-substitution within the ranges associated with the most advantageous elastomeric character and textile properties, generally, that is 10 to 20 percent or 15 to 33⅓ percent depending upon the nature of the diamine used in their manufacture, there can be obtained, conveniently by melt-spinning, filaments having a tenacity of at least 0.2 gm. per denier, generally more than 0.4 gm. per denier, an Elastic Recovery from 50 percent extension of at least 78 percent, and a Work Recovery from 50 percent extension of at least 40 percent. Moreover, the filaments as with those derived from copolyamides of this invention in which the degree of N-substitution is out with the aforementioned desirable ranges but within the broad range of 10 to 34 percent, do not discolour when exposed to a xenon arc or bleached with sodium chlorite in accordance with the Light and Bleaching Resistance Tests hereinafter defined.

Before proceeding with a detailed description of this invention, there are now set forth by way of definition certain terms some of which are employed for the purpose of characterising filaments of of this invention, and all of which will appear in the description which follows and some in the claiming clauses appended thereto.

Extensibility.—By extensibility of the filaments is meant the length by which they can be extended before they break expressed as a percentage of their original length.

Tenacity.—The breaking load of the filaments expressed in grams per denier.

Initial modulus.—By initial modulus of the filaments is meant the quotient obtained by dividing the specific stress by the strain, when the strain is an extension of 1 percent of original length. (Specific stress is defined at page 138 of the "Textile Terms and Definitions" 4th edition published by the Textile Institute, Manchester and may be expressed in grams per denier.)

Elastic recovery.—The elastic recovery of the filaments is expressed by the fraction obtained by dividing the length by which the filaments are extended on the application of stress thereto, into the length by which they contract on removal of the stress therefrom. The fraction is commonly expressed as a percentage.

Work recovery.—The work recovery of the filaments is expressed by the fraction obtained by dividing the energy or work expended in stretching the said filaments by applying a stress thereto, into the energy or work recovered when said filaments retract to their original dimensions on release of the stress. The fraction is commonly expressed as a percentage.

Rupture temperature.—The lowest temperature at which the filaments rupture when brought into contact with a hot smooth surface.

Light resistance.—The light resistance of the filaments is tested by exposure of the filaments wound on a frame to a xenon arc for a period of 300 hours. The elastic properties and colour of the filaments are determined before and after exposure.

Bleaching resistance.—The bleaching resistance of the filaments is determined by immersion thereof for a period of 45 minutes in an aqueous solution containing 0.1 percent by weight of sodium chlorite and 0.5 cc. per litre of glacial acetic acid maintained at 85° C. so that the solution had a pH of 4. The colour of the filaments is determined before and after the bleaching treatment.

Inherent viscosity.—The phrase "inherent viscosity" signifies twice the natural logarithm of the quotient of the viscosity at 25° C. of a solution of a ½ percent weight by volume of the polyamide dissolved in 90 percent weight by weight aqueous phenol solution as solvent divided by the viscosity of the said solvent at the same temperature. The viscosity measurements are carried out on an Ostwald type viscometer.

Degree of N-substitution.—The phrase "degree of N-substitution" refers to the number, expressed as a percentage, of amide hydrogen atoms which are replaced by hydrocarbon or substituted hydrocarbon groups in the polyamide.

The term "filament" as used herein comprehends, except where the context indicates otherwise, yarns, fibres, and threads in addition to continuous filaments.

From the standpoint both of availability and satisfactory operation of the process of this invention the most suitable lactams for use in the polymerisation reaction are epsilon-caprolactam, omega-enantholactam and omega-capryllactam. Mixtures of these lactams may also be used in this invention.

N-mono-substituted aliphatic diamines suitable for use in this invention, are secondary-primary diamines having the formula $RNHXNH_2$ where R is a hydrocarbon, or substituted hydrocarbon group, preferably an alkyl group and X is a divalent alkylene radical, preferably one containing six or more carbon atoms in the chain.

Examples of suitable N-mono-substituted aliphatic diamines include N-hexadecyltrimethylene diamine, N-ethylhexamethylene diamine, N-isobutylhexamethylene diamine, N-laurylhoxamethylene diamine, N-isobutyl decamethylene diamine, N-ethyl decamethylene diamine and N-cyclohexyl decamethylene diamine.

The N,N'-disubstituted aliphatic diamines suitable for use in this invention are disecondary aliphatic diamines having the formula RNHXNHR' where R and R' are hydrocarbon or substituted hydrocarbon groups which may be the same or different and X is a divalent alkylene radical, preferably one containing six or more carbon atoms in the chain.

Examples of suitable N,N'-disubstituted disecondary aliphatic diamines include N,N'-diheptyltrimethylene diamine, N,N'-diethyl hexamethylene diamine, N,N'-diisobutyl hexamethylene diamine, N,N'-diisobutyl decamethylene diamine, N,N'-diethyl decamethylene diamine N,N'-dipropyldodecamethylene diamine, N,N'-diethyl octadecamethylene diamine and N,N'-dicycle hexyldecamethylene diamine.

It is not necessary that the N-substitution be completely aliphatic. Thus in addition to the strictly alkyl substituents, the aralkyl groups exemplified by gamma-phenyl propyl and benzyl may be used for the N-substitution. Mixtures of two or more N-monosubstituted diamines or N,N'-disubstituted aliphatic diamines, or mixtures of the two types of substituted diamine may be used. In the former mixtures the diamines may have different polymethylene chain lengths provided they are simple aliphatic diamines and/or different alkyl, cycloalkyl or aralykyl group substituents. Furthermore the N-substitution in the case of the di-substituted diamine need not be the same for each substituent. Thus N-ethyl, N'-isobutyl hexamethylene diamine and N-propyl, N'-isobutyl decamethylene diamine may also be used in this invention.

Any aliphatic alpha, omega dicarboxylic acid which contains at least five carbon atoms in an alkylene chain may be utilised in the process of the present invention. The carbon chain may be interrupted by hetero atoms, for example, oxygen, and it may carry lateral substituents. Illustrative of suitable acids there may be mentioned adipic, sebacic, pimelic, suberic, azelaic, dodecamedoic and octodecanol acids. More than one dicarboxylic acid may be used in the copolyamide forming reaction.

As indicated previously the substituted diamine whether it be a secondary-primary or disecondary aliphatic diamine, and the dicarboxylic acid can be employed in the form of their diammonium dicarboxylate salt.

In the manufacture of the present N-substituted copolyamides the reactants may be brought together in any convenient manner, provided that the substituted diamine is present in an amount sufficient to provide the resultant polyamide with 10 to 34 percent of its nitrogens substituted with groups other than hydrogen atoms, that is to say, for example, at a temperature high enough for reaction to take place.

For instance, having arranged that the substituted diamine be employed in an amount sufficient to provide the resultant copolyamide with the desired degree of N-substitution, the lactam is introduced into an approximately equi-molecular mixture of the substituted diamine and the dicarboxylic acid, and the polymerisation effected by heating the reactants.

In place of the approximately equi-molecular mixture of the substituted diamine and dicarboxylic acid, there may conveniently be employed the chemically equivalent diamine-dicarboxylic acid salt derived therefrom, for example N-mono-isobutyl hexamethylene diammonium adipate (derived from N-monoisobutylhexamethylenediamine and adipic acid). The starting materials used in making the present copolyamides may be brought together in any desired order. If the salt is employed as just mentioned, the lactam can be added to the N-monoisobutyl hexamethylene diammonium adipate and the two heated together in order to effect polymerisation, or the lactam can be added to the reaction mixture during the polymerisation of the N-mono-isobutylhexmethylene diammonium adipate.

In order that the lactams enter into the polymersiation reaction we usually find it desirable to employ small quantities of a polymerisation catalyst. Suitable polymerisation catalysts are those neutral and acid catalysts known for the polymerisation of lactams. Examples of acid catalysts are strong mineral acids such as phosphoric acid, sulphuric acid or hydrochloric acid. Examples of neutral catalysts are dicarboxylic-acid salts of aliphatic diamines, such as hexamethylene diammonium adipamide, otamethylene diammonium sebacamide, amino-carboxylic acids such as omega-amino-caproic acid and omega-amino-undecanoic acid, and water.

An acid catalyst, for example, phosphoric acid also assists polymerisation of the substituted diamine and the dicarboxylic acid. The polymerisation catalyst, which expression includes the catalyst used to promote the lactam polymerisation and/or that used to promote the diaminedicarboxylic acid polymerisation, are generally used in amounts of between 0.01 to 2 percent by weight, preferably 0.05 to 0.2 percent by weight, with reference to the weight of the polyamide-forming components.

One method of carrying out the process of the present invention is to mix the lactam with the substituted diamine and the aliphatic dicarboxylic acid, or the salt derived therefrom, and then heat the mixture, in the presence of a polymerisation catalyst, up to, say 250° C., at which temperature the reaction mixture is held for a certain period. In order to increase the inherent viscosity of the melt, i.e. the molecular weight of the copolymer, it may sometimes be advantageous to hold the melt under vacuum for a further period at a temperature in the range, say of 250° C. to 300° C.—or by subjecting the melt under nitrogen, to a very efficient stirring.

The reaction is preferably carried out under an inert atmosphere, for example, nitrogen, to prevent oxidation of the polymer components. Efficient mechanical mixing of the reagents is highly desirable.

Among the reagents employed in making the N-substituted copolyamides of this invention there may be included adjuvants such, for example, as pigments, plasticisers, delustrants and/or stabilisers.

In certain instances it may be convenient to incorporate a branching agent in the polyamide-forming reaction mixture. Suitable branching agents include bis-gamma-isobutyl-amino-propylamine, bis-gamma-amino propylamine and trimesic acid (benzene-1,3,5-tricarboxylic acid).

The N-substituted copolyamides of this invention preferably possess a molecular weight corresponding to an inherent viscosity of 0.5 to 1.5.

The preferred method of obtaining filaments from the N-substituted polyamides is by melt-spinning and the invention further includes this operation and the filaments derived therefrom. Any conventional melt-spinning process is suitable. The filaments so obtained possess good elastic properties, particularly when the degree of N-substitutions is in the range 10 to 20 percent or 15 to 33⅓ percent (depending upon the nature of the diamine), a well developed general chemical stability, particularly toward the ordinary solvents, a poor water sensitivity and consequently a good resistance to hydrolytic action as well as resistance to bleaching agents. They do not discolour when exposed to a xenon arc or when bleached with sodium chlorite in accordance with the Light Resistance and Bleaching Resistance Tests hereinbefore defined. Desirably the filaments are drawn in the solid state to from 2 to 5 times their original length the operation of drawing reduces the extensibility of the filaments and improves their stress decay and elastic properties and reduces the tackiness of the filaments. The filaments are usually submitted to an annealing treatment before use and this may take the form of submitting the filaments to a hot wet treatment, for example, with boiling water during dyeing or scouring before commercial use.

One suitable annealing treatment involves exposing the filaments to hot water for a certain period. Thus, the filaments collected around a bobbin may be immersed in water at a temperature of 60° C., and the temperature of the water gradually raised (for example, over a period of ½–¾ hour) to 100° C. There is little or no coalescence of the filaments on the bobbin which remain free or substantially so from adjacent filaments. Another suitable annealing treatment involves heating the filaments in a dry oven at a temperature of 120° C. to 140° C. for a period of 30 to 60 minutes.

In certain instances it may be desirable to apply to the filaments, preferably immediately after the solidification has occurred, an anti-tack agent. Finely divided talc is a very suitable material for this purpose and it is generally dusted on.

The N-substituted copolyamide filaments provided by this invention are suitable for use in the manufacture of the so-called foundation garments, such as corsets, in elastic outerwear, for instance, sweaters, ski-trousers and also in surgical elastic hosiery and bandages.

They may also be utilised in the manufacture of woven or knitted swimwear, hosiery, brassieres and pyjamas. The present filaments are likewise adapted for application in the form of staple fibres, especially when blended with, for example, wool, cotton and polyhexamethylene adipamide fibres. The novel N-substituted copolyamide filaments of this invention may be fabricated into composite elastic yarns, for instance, by introducing them as continuous filaments together with one or more rovings of staple fibres, for example, polyethylene terephthalate, wool or cotton fibres, into a conventional spinning or drafting frame. In the form of staple or continuous filaments or yarns derived from the filaments, the present N-substituted copolyamides can be used in the making of nonwoven fabrics of many kinds.

The N-alkyl substituted copolyamides of this invention also find an application in the manufacture of melt-spun heterofilaments in which they constitute one component, the other component or components, being a different fibre-forming polymer, and as an elastomeric component they may confer on the heterofilaments containing them unique and useful properties.

Having thus described the principles and purpose of the invention, the following non-limitative examples are set forth to facilitate a more comprehensive understanding thereof.

EXAMPLE 1

This example describes the manufacture of an N-substituted copolyamide according to this invention which is derived from the secondary, primary aliphatic diamine, N-mono-isobutylhexamethylene diamine, sebacic acid and epsilon caprolactam.

Preparation of N-mono-isobutyl hexamethylene diammonium sobacate.—40 grams (0.2 mole) of sebacic acid were dissolved in 100 mls. of hot ethanol and the resulting solution added to one formed by dissolving 36 gms. (0.21 mole) of N-mono-isobutyl hexamethylene diamine in 50 mls. of ethanol. The solution was then concentrated by boiling off approximately half the quantity of ethanol present and the cooled mixture diluted with about 2000 mls. of ether thereby precipitating the diammonium dicarboxylate salt which melted at 117° C.

Preparation of an U-substituted copolyamide from this salt and epsilon caprolactam.—36.4 gms. (0.1 mole) of this N-mono-isobutyl hexamethylene diammonium sebacate were added to 56.5 gms. (0.5 mole) of epsilon-caprolactam to form a mixture in which the molar ratio of the two components was 0.2:1. To this mixture there was added 0.1 gm. of orthophosphoric acid and 1.5 gms. of omega-amino undecanoic acid which served as catalysts for the subsequent polymerisation of the diamine/dibasic acid salt and the lactam respectively. Three Carius tubes were charged with the mixture, and then sealed under nitrogen. The tubes were heated in a rocking Carius furnace at a temperature of 265° C. for a period of 5 hours. At the end of this period the polymerisation was only half complete. The half made polymer was removed from the tubes and added to an open tube where the completion of the polymerisation was effected by heating at a temperature of 285° C. for 1 hour, followed by a further period of 2.5 hours at 300° C. under a slow stream of nitrogen, and finally by applying a vacuum of 10 mm. of Hg for a period of 1.5 hours while maintaining a temperature of 300° C.

The resulting copolyamide in which approximately 14 percent of the nitrogen atoms therein carried isobutyl substituents (i.e. the degree of N-substitution was approximately 14 percent) had an inherent viscosity of 0.699.

This N-substituted copolyamide was melt-spun at a temperature of 230° C. into 5 filaments which were dusted with talc and then wound onto a bobbin at a rate of 200 feet per minute. The total denier was approximately 284.

The filaments were then subjected to an annealing treatment which comprised immersing the bobbin on which the filaments were wound in water at a temperature of 60° C., and then raising the temperature of the water to approximately 100° C. over a period of approximately 30 minutes. The filaments extended in length 1.92 percent on annealing and were found to possess the following properties:

Tenacity _____grams per denier__ 0.3534
Modulus at 100 percent extension_____do____ 0.1190
Extensibility _____percent__ 544
Rupture temperature _____ 148.5
Elastic recovery from 50 percent extension _____percent__ 86
Work recovery from 50 percent extension _____do____ 50

Example 2

A 14 percent N-substituted copolyamide made in the manner described in Example 1 was melt-spun into filaments and the latter drawn to three times their original length.

A number of the filaments were then annealed by the procedure described in Example 1 above when they extended 1.43% in length.

The filaments were found to have a denier of 164 and to possess the properties set forth in the following table:

Tenacity _____grams per denier__9.5703
Modulus at 100 percent extension_____do____ 0.1927
Extensibility _____percent__ 464
Rupture temperature _____° C__ 161
Elastic recovery from 50 percent extension _____percent__ 88
Work recovery from 50 percent extension _____do____ 51

The filaments of this, and the previous example displayed a good resistance to hydrolytic action as well as resistance to bleaching agents. For instance they did not discolour when exposed to a xenon arc or when bleached with sodium chlorite in accordance with the Light Resistance and Bleach Resistance Tests hereinbefore defined.

Example 3

37.4 gms. (0.1 mole) of N-monoisobutyl hexamethylene diammonium sebacate were added to 56.5 gms. (0.5 mole) of epsilon-caprolactam to form a mixture in which the molar ratio of the reactants was 0.2:1. 0.1 gm. of meta-phosphoric acid was added to the mixture which was then charged to three Carius tubes which were then sealed under nitrogen and then heated at 265° C. for a period of 3 hours. The polymerisation was completed by a further heating at a temperature of 285° C. for a period of one hour followed by four hours at a temperature of 300° C., the heating being done while the melt was maintained under a stream of nitrogen and vigorously stirred with a helical stirrer. The resulting copolyamide in which approximately 14 percent of the nitrogens were substituted with isobutyl groups had an inherent viscosity of 0.715, and it was melt-spun into filaments possessing useful elastomeric character.

Example 4

34.74 gms. (0.2 mole) of N-mono-isobutylhexamethylene diamine and 40.4 gms. (0.2 mole) of sebacic acid were dissolved in 40 gms. of water and the mixture charged to a small autoclave to which were added 181 gms. (1.6 moles) of caprolactam and 0.2 ml. of orthophosphoric acid. The autoclave was purged with nitrogen, sealed and heated at 265° C. for 3 hours under pressure. The pressure was reduced to atmospheric and the temperature raised to 300° C. and maintained for 4 hours with constant stirring. The polymer was extruded in the form of a ribbon and it had the following analysis:

Amine end group equivalents pere $10^6$ gms. _____ 26
Carboxyl end group equivalents per $10^6$ gms. ____ 62
Inherent viscosity _____ 0.997

The resulting polyamide possessed an approximate degree of substitution of 10 percent, the substituents on the nitrogen atoms being isobutyl groups. It had an inherent viscosity of 0.8.

The copolyamide in the form of fine chips was then heated to a temperature of 230° C. and the molten polymer melt-spun by a conventional process through a spinneret at a through-put of 1.7 gms. per minute, into a cooling atmosphere where solidification of the filaments occurred. After this solidification, the yarn so obtained was dusted with finely divided talc and then wound up onto a bobbin at a speed of 200 feet per minute.

A length of the yarn so obtained was annealed by the procedure set forth in Example 1. The annealed yarn was found to possess the following properties:

Tenacity _____grams per denier__ 0.65
Initial modulus (at 100 per extension) _____do____ 0.51
Extensibility _____percent__ 432
Rupture temperature _____° C__ 150
Elastic recovery from 50 percent extension _____percent__ 80
Work recovery from 50 percent extension __do____ 40

Another length of the yarn was drawn to 3 times its length over a hot plate at 60° C. and the drawn yarn then annealed as before. The drawn and annealed yarn had the following properties:

Tenacity _____grams per denier__ 1.1
Modulus at 100 percent extension_____do____ 0.69
Extensibility _____percent__ 230
Rupture temperature _____° C__ 155
Elastic recovery from 50 percent extension _____percent__ 80
Work recovery from 50 percent extension __do____ 40

Example 5

This example and those which follow are concerned with N-substituted copolyamides in accordance with this invention in which the diamine component is a disecondary N,N'-disubstituted aliphatic diamine.

Preparation of N,N'-di-isobutyl hexamethylene diamine.—1152 gms. (16 moles) of isobutyraldehyde were added dropwise over a period of two hours to a stirred solution formed by dissolving 928 gms. (8 moles) of hexamethylene diamine in 620 mls. of distilled water. The temperature of the reaction mixture during the addition was maintained at between 15 and 20° C. The stirring was stopped, and the aqueous layer which separated, run off, leaving at the product a Schiff's base which was dried with anhydrous sodium sulphate as a dessicating salt. The dried Schiff's base was separated from the sodium sulphate by filtration, diluted with an equal volume of ethanol and thereafter reduced over a two hour period, by heating the base, in a 5 litre autoclave, stirred at a temperature of 40° C., in the presence of platinum oxide as catalyst and under an atmosphere (1500-2000 pounds per square inch) of hydrogen. The catalyst was separated and the ethanol stripped out of the reduced product which was thereafter distilled twice through a 36 inch Vigreux column. Its boiling point 110° C. at 1.0 mm. Hg pressure, and its chromatographic and chemical analysis showed it to be N,N'-di-isobutyl hexamethylene diamine of 99.5 percent purity. Substituted diamine of this high degree of purity is desirable from the standpoint of ensuring that the resulting polyamide has an acceptable inherent viscosity.

Preparation of an N-substituted copolyamide.—237 gms. (1.04 moles) of N,N'-di-isobutyl hexamethylene diamine prepared as above, were added to 202 gms. (1 mole) purified sebacic acid and 740 gms. (5.25 moles) capryllactam to form a mixture in which the molar ratio of the components was 0.190:0.190:1. To this mixture there was added a catalyst for the subsequent polymerisation reaction 20 gms. (0.1 mole) of omega-aminoundecanoic acid, 1.23 gms. of orthophosphoric acid and 50 mls. of water.

The mixture was charged to a 4 litre autoclave which was then purged with nitrogen and sealed. The temperature of the reaction mixture, under a positive pressure of nitrogen, was gradually raised over a period of three hours to 220° C. The temperature of the mixture was then raised to 285° C. over a further period of three hours. During this period the pressure in the autoclave was reduced to atmospheric. Thereafter the reaction mixture was maintained for a period of two and a half hours at a temperature of 285° C. under a vacuum of 10 mm. Hg. The mixture was then allowed to cool under the atmosphere of nitrogen.

The resulting copolyamide, in which approximately 27.5 percent of the nitrogen atoms carried isobutyl substituents had an inherent viscosity of 0.683.

This N-substituted copolyamide was melt-spun at a temperature of 220° C., into 5 filaments which were dusted with talc and then wound onto a bobbin at a rate of 200 feet per minute.

The filaments had a total denier of 105 and a rupture temperature of 145° C. and the recovery properties set forth in the table below:

| Property: | Percent |
|---|---|
| Elastic recovery from 50 percent extension | 78 |
| Work recovery from 50 percent extension | 40 |

Example 6

A 27.5 percent N-substituted copolyamide made in the manner described in Example 5 was melt-spun into filaments and the latter drawn at a temperature of 100° C. to three times their original length.

The filaments which had a total denier of 56 were found to possess the properties set forth in the table below:

| | |
|---|---|
| Tenacity _____grams per denier__ | 0.6580 |
| Modulus at 100 percent extension _____do____ | 0.291 |
| Extensibility _____percent__ | 364 |
| Rupture temperature _____° C__ | 143 |
| Elastic recovery from 50 percent extension _____percent__ | 78 |
| Work recovery from 50 percent extension _____do____ | 40 |

Example 7

240 gms. (1.05 moles) of N,N'-di-isobutyl hexamethylene diamine prepared by the procedure set forth in Example 5 were added to 202 gms. (1.0 mole) of purified sebacic acid and 678 gms. (6 moles) of caprolactam to form a mixture in which the molar ratio of the components was 0.167:0.167:1. To this mixture there was added as catalysts for the subsequent polymerisation, 20 gms. (0.1 mole) of omega-amino-undecanoic acid, 50 gms. of water, and 1.52 gms. orthophosphoric acid. The mixture was charged to a 4 litre autoclave fitted with a stirrer and the autoclave was then purged with nitrogen and sealed.

The temperature of the reaction mixture, under a positive pressure of nitrogen, was gradually raised to 285° C. The mixture was agitated at the same temperature for a period of three hours. Thereafter the pressure in the autoclave was gradually reduced to atmospheric, while the temperature of the reaction mixture was raised to 300° C., at which temperature the mixture was maintained for a period of one hour under a slow (2 litres per hour) stream of nitrogen. The reaction mixture was held for a further period of one hour at the temperature of 300° C. under vacuum of 25 mm. of Hg and then for another period of 1 hour under a vacuum of 0.1 mm. of Hg. The product was allowed to cool under the atmosphere of nitrogen.

The resulting copolyamide, in which approximately 25 percent of the nitrogen atoms carried isobutyl substituents had an inherent viscosity of 0.836.

The N-substituted copolyamide was melt spun at a temperature of 220° C. into 5 filaments which were dusted with talc and then wound onto a bobbin at a rate of 200 feet per minute. The filaments were then subjected to an annealing treatment similar to that previously described in Example 1. The annealed filaments were found to possess the following properties:

| | |
|---|---|
| Denier _____ | 280 |
| Tenacity _____grams per denier__ | 0.384 |
| Modulus at 100 percent extension _____do____ | 0.1770 |
| Extensibility _____percent__ | 550 |
| Rupture temperature _____° C__ | 160 |
| Boiling water shrinkage _____percent__ | 2.7 |
| Elastic recovery from 50 percent extension _____do____ | 90 |
| Work recovery from 50 percent extension _____do____ | 64 |

Another quantity of the N-substituted copolyamide was made in an identical manner but, on this occasion, the filaments after extrusion were drawn at various draw ratios prior to annealing.

The properties of the filaments, drawn to the different ratios over a hot plate (60° C.), are shown in the table which follows:

| | Draw Ratio | | |
|---|---|---|---|
| Property | 3:1 | 4:1 | 5:1 |
| Denier | 94 | 86 | 60 |
| Rupture temperature (° C.) | 163 | 164 | 155 |
| Shrinkage on annealing (percent) | 4.0 | 4.7 | 8.2 |
| Tenacity gms./denier | 0.7226 | 0.8175 | |
| Modulus at 100 percent extension gms./denier | 0.2241 | 0.2674 | 0.4833 |
| Extensibility (percent) | 424 | 356 | 278 |
| Elastic recovery from 50 percent extension | 91 | 91 | 91 |
| Work recovery from 50 percent extension | 59 | 60 | 61 |

Example 8

An N-substituted copolyamide prepared by the procedure set forth in Example 7 and having approximately 25 percent of its nitrogen atoms substituted with isobutyl groups was boiled with distilled water for a period of one hour to extract the small amount of unreacted epsilon-caprolactam.

The lactam-extracted polymer, which had an inherent viscosity of 0.869, was melt spun at a temperature of 230° C. into 5 filaments which were dusted with talc and then wound on to a bobbin at a rate of 200 feet per minute.

A number of the filaments were then subjected to an annealing treatment which comprised immersing the bobbin on which the filaments were wound in water at a temperature of 60° C., raising the temperature of the water to 100° C. in 30 minutes which temperature was maintained for a further period of 30 minutes.

The filaments had the properties set forth in the table which follows:

| | Filament | |
|---|---|---|
| Property | Unannealed | Annealed |
| Rupture temperature (° C.) | 135 | 145 |
| Elastic recovery from 50 percent extension | 86 | 90 |
| Work recovery from 50 percent extension | 51 | 60 |
| Stress decay (percent): | | |
| After 30 minutes | 49.4 | 31.75 |
| After 16 hours | 56.1 | 40.6 |

It will be observed that the stress decay of the filaments was reduced some 40 percent on annealing.

Another quantity of the N-substituted copolyamide was made in an identical manner and the lactam extracted as before but on this occasion different filaments after extrusion were drawn, at various draw ratios, over a hot plate (60° C.) and the drawn filaments annealed by the technique described in this example.

The properties of the filaments drawn to the different draw ratios are shown in the table that follows:

| Property | Draw Ratio | |
|---|---|---|
| | 3:1 | 5:1 |
| Denier | 63 | 48 |
| Rupture temperature (° C.) | 132 | 161 |
| Shrinkage on annealing (percent) | 4.0 | 8.0 |
| Tenacity (gm./denier) | 0.2667 | 0.3664 |
| Modulus at 100 per extension gms./denier | 0.2381 | 0.2726 |
| Extensibility (percent) | 328 | 240 |
| Elastic Recovery from 50 percent extension | 90 | 91 |
| Work Recovery from 50 percent extension | 58 | 59 |

Example 9

192 gms. (0.84 mole) of N,N'-di-isobutyl hexamethylene diamine prepared by the procedure set forth in Example 5 were added to 117 gms. (0.8 mole) of purified adipic acid and 633 gms. (5.6 moles) of caprolactam to form a mixture in which the components were present in a molar ratio of 0.143:0.143:1.

To this mixture there was added 16 gms. (.08 mole) omega-amino-undecanoic acid, 50 mls. of water and 1.4 gms. of orthophosphoric acid, as catalysts for the subsequent polymerisation reaction, which was conducted in a 4 litre autoclave in a similar manner to that described in relation to the copolyamide-forming reaction in Example 5.

The resulting copolyamide in which 22 percent of the nitrogen atoms carried isobutyl substituents had an inherent viscosity of 0.684. It was melt spun at a temperature of 210° C. into 5 filaments, which were dusted with talc and then wound on to a bobbin at a rate of 200 feet per minute. The filaments were drawn to 3 times their original length before being subjected to an annealing treatment which comprised immersing the bobbin on which the filaments were wound in water at a temperature of 60° C. and then raising the temperature of the water to approximately 100° C. over a period of 30 minutes. As a result of the annealing treatment the filaments extended 3 percent in length. The annealed filaments were found to have the properties shown in the table which follows:

Denier _____ 75
Tenacity _____grams per denier__ 0.4162
Modulus at 100 percent extension _____do____ 0.1624
Extensibility _____percent__ 417
Rupture temperature _____° C__ 168
Elastic recovery from 50 percent extension
                                          percent__ 89
Work recovery from 50 percent extension__do____ 54

Example 10

192 gms. (0.84 mole) of N,N'-di-isobutyl hexamethylene diamine prepared by the procedure set forth in Example 5, were added to 162 gms. (0.8 mole) of purified sebacic acid and 814 gms. (7.2 moles) of caprolactam to form a mixture in which the components were present in the molar ratio of 0.111:0.111:1. To this mixture there was added as catalysts for the subsequent polymerisation reaction 16 gms. (0.08 mole) of omega-amino-undecanoic acid, 50 mls. of water and 1.75 gms. of orthophosphoric acid. The mixture was charged to a 4 litre autoclave, purged with nitrogen and sealed. The polymerisation was effected by the procedure described in the Example 5.

The resulting copolyamide in which 18 percent of the nitrogen atoms carried isobutyl groups had an inherent viscosity of 0.616. It was melt spun at a temperature of 200° C. into filaments which were dusted with talc and then drawn to 3 times their original length and cooled.

The drawn filaments after being subjected to a similar annealing treatment to that previously described possessed the following properties:

Denier _____ 108
Tenacity _____grams per denier__ 0.9162
Modulus at 100 percent extension_____do____ 0.8167
Extensibility _____percent__ 225
Rupture temperature _____° C__ 167
Elastic recovery from 50 percent extension
                                          percent__ 84
Work recovery from 50 percent extension__do____ 46

Example 11

8.088 gms. (0.35 mole) of N,N'-di-isobutyl hexamethylene diamine prepared as previously described in Example 5, 7.9 gms. (0.34 mole) of dodecanedoic acid, and 28.76 gms. (0.204 mole) capryl lactam together with 0.4 gm. aminoundecanoic acid and 0.04 ml. of orthophosphoric acid were sealed in a nitrogen-purged Carius tube and heated at 265° C. for 4 hours in a rocking carius furnace. The half-made polymer was then heated for a further 3 hours at 295° C. in an open tube under a nitrogen atmosphere, stirring continuously with a helical stirrer.

The polymer which was extruded in the form of a ribbon had the following analysis:

Amine end group equivalent per $10^6$ gms. _____ 13
Carboxyl end group equivalents per $10^6$ gms. _____ 112
Inherent viscosity _____ 0.81

The resultant copolyamide in which the degree of N-substitution was about 25 percent was melt-spun by a conventional process at a temperature of 190° C. and at a throughput of 1.6 gms. per minute into a cooling atmosphere where solidification of the filaments occurred. After the solidification point, the yarn so obtained was dusted with finely-divided talc and then wound up onto a bobbin at a speed of 200 feet per minute. A length of this yarn was then annealed by immersing the bobbin thereof in boiling water for a period of ½ hour. The annealed but undrawn yarn had the properties shown in the following table:

Tenacity _____grams per denier__ 0.88
Modulus at 100 percent extension_____do____ 0.51
Extensibility _____percent__ 336
Rupture temperature _____° C__ 140
Elastic recovery from 50 percent extension
                                          percent__ 85
Work recovery from 50 percent extension __do____ 45

Another length of the yarn was then drawn to three times its original length over a hot plate (60° C.). The drawn but unannealed yarn had the properties shown in the following table:

(Yarn drawn 3× 60° C. unannealed)

Tenacity _____grams per denier__ 0.8134
Modulus at 100 percent extension _____do____ 0.2929
Extensibility _____percent__ 384
Rupture temperature _____° C__ 145
Elastic recovery from 50 percent extension
                                          percent__ 44
Work recovery from 50 percent extension
                                          do____ 84

Example 12

8.088 gms. (0.35 mole) of N,N'-di-isobutyl hexamethylene diamine prepared as previously described, 7.9 gms. (0.34 mole) of dodecanedioic acid, 25.91 gms. (0.204 mole) enantholactam together with 0.4 gm. aminoundecanoic acid and 0.02 ml. of orthophosphoric acid as polymerisation catalysts were reacted together as in the previous example. The resultant copolyamide had the following analysis:

Amine end group equivalents per $10^6$ gms. _____ 16
Carboxyl end group equivalents per $10^6$ gms. _____ 19
Inherent viscosity _____ 0.77
Degree of N-substitution, percent _____ 25

The copolyamide was converted into a continuous filament yarn by the procedure described in the previous example and a length of the yarn annealed as before and another length drawn, over a hot plate (60° C.) to three times its original length.

The undrawn, annealed yarn possessed the following properties shown in the table which follows:

| | |
|---|---|
| Tenacity _____grams per denier__ | 0.648 |
| Initial modulus at 100 percent extension __do____ | 0.282 |
| Extensibility _____percent__ | 396 |
| Rupture temperature _____° C__ | 148 |
| Elastic recovery from 50 percent extension percent__ | 88 |
| Work recovery from 50 percent extension__do____ | 50 |

The drawn, unannealed yarn had the properties shown in the following table:

| | |
|---|---|
| Tenacity _____grams per denier__ | 0.750 |
| Initial modulus at 100 percent extension __do____ | 0.236 |
| Extensibility _____percent__ | 422 |
| Rupture temperature _____° C__ | 150 |
| Elastic recovery from 50 percent extension percent__ | 89 |
| Work recovery from 50 percent extension__do____ | 50 |

Example 13

116.3 gms. (0.51 mole) N,N'-di-isobutyl hexamethylene diamine 115 gms. (0.5 mole) dodecanedioic acid, 282.5 gms. (2.5 moles) epsilon-caprolactam, 65.5 gms. (0.5 mole) aminocaproic acid and 0.33 ml. orthophosphoric acid were placed in a 2 litre tall form reaction vessel, fitted with a reflux condenser and a closely fitting 3½" in diameter double helical stirrer complete with a gas tight stirrer guide. The height of the helical stirrer was such that the surface of the molten reactants was below the top flight of the helical stirrer ensuring that during stirring the surface of the molten reactants was broken by the stirring helix. The reaction vessel was purged with nitrogen and an ambient nitrogen atmosphere was maintained by a slow bleed of this gas at 1–2 litre/hour. The vessel was heated to 230° C. and the temperature maintained with complete reflux for 2 hours with a stirrer speed of 30–40 r.p.m. The temperature was then raised to 260° C. for a period of 2 hours and during the last ½ hour of this period water was removed through a small fractionating column. The temperature was then raised to 300° C. and maintained at this temperature for 4 hours. During the 4 hours the stirrer speed was 30–40 r.p.m. for ½ hour with a nitrogen bleed of 1–2 litre/hour. The fractionating column was then removed and the stirrer speed increased to 100 r.p.m. for the next 2 hours with a nitrogen bleed of 15 litre/hour. During the last 1¼ hours the stirrer speed was increased to 150 r.p.m. with a nitrogen bleed of 50–75 litres/hour.

The resulting polymer which was extruded in the form of a ribbon had the following analysis:

| | |
|---|---|
| Amino end group equivalents per $10^6$ gms. _____ | 19.6 |
| Carboxyl end group equivalents per $10^6$ gms. _____ | 60 |
| Inherent viscosity _____ | 0.84 |
| Degree of N-substitution, percent _____ | 25 |

The copolyamide was converted into a continuous filament yarn by the procedure described more fully in Example 11. A length of this yarn was annealed by immersion in water at a temperature of 60° C. which was then raised to 100° C. in ½ hour, and heated at 100° C. for a further hour.

The properties of the yarn annealed in boiling water are shown in the following table:

| | |
|---|---|
| Tenacity _____grams per denier__ | 0.65 |
| Modulus at 100 percent extension _____do____ | 0.15 |
| Extensibility _____percent__ | 553 |
| Rupture temperature _____° C__ | 145 |
| Elastic recovery from 50 percent extension percent__ | 87 |
| Work recovery from 50 percent extension___do____ | 40 |

Another length of the undrawn yarn was annealed by heating it in a dry air oven at 140° C. for 60 minutes. The undrawn yarn annealed in hot dry air had the properties shown in the following table:

| | |
|---|---|
| Tenacity _____grams per denier__ | 0.46 |
| Modulus at 100 percent extension _____do____ | 0.15 |
| Extensibility _____percent__ | 766 |
| Rupture temperature _____° C__ | 145 |
| Elastic recovery from 50 percent extension percent__ | 90 |
| Work recovery from 50 percent extension __do____ | 48 |

What we claim is:

1. N - alkyl - substituted copolyamide elastomers as claimed in claim 6 wherein an N-alkyl-substituted diamine is utilized in the copolyamide and the degree of N-substitution in the copolyamide is 10 to 20 percent.

2. N - alkyl - substituted copolyamide elastomer as claimed in claim 6 wherein the N-alkyl-substituted aliphatic diamine is N-hexadecyltrimethylene diamine, N-ethylhexamethylene diamine, N-isobutylhexamethylene diamine, N-laurylhexamethylene diamine, N-isobutyl decamethylene diamine, N-ethyl decamethylene diamine or N-cyclohexyldecamethylene diamine.

3. N - alkyl - substituted copolyamide elastomers as claimed in claim 6 wherein an N,N'-dialkylsubstituted diamine is utilized in the copolyamide and the degree of N-substitution in the copolyamide is 15 to 33⅓ percent.

4. N - alkyl - substituted copolyamide elastomers as claimed in claim 6 wherein an N,N'-dialkyl-substituted aliphatic diamine is used which is N,N'-diheptyltrimethylene diamine, N,N'-diethyl hexamethylene diamine, N,N'-diisobutyl hexamethylene diamine, N,N'-diisobutyl decamethylene diamine, N,N'-diethyl decamethylene diamine, N,N'-dipropyldodecamethylene diamine, N,N'-diethyl octadecamethylene diamine or N,N'-dicyclohexyldecamethylene diamine.

5. Copolyamide elastomers as set forth in claim 6, wherein the lactam is epsilon-caprolactam, omega-enantholactam, omega-capryllactam or mixtures of any one of these lactams.

6. N-alkyl substituted copolyamide elastomers having a degree of N-substitution of between 10 and 34 percent and consisting essentially of soft segments of a low molecular weight partially polymerized polyamide of an N-alkyl substituted or an N,N'-dialkyl substituted aliphatic diamine and an aliphatic-alpha, omega-dicarboxylic acid which if fully polymerized to give a fiber forming homopolymer would possess a relatively low melting point and hard segments of a low molecular weight partially polymerized polyamide of a lactam of an aminocarboxylic acid which if fully polymerized so as to constitute a fiber forming homopolymer would possess a relatively high melting point, said copolyamides, on melt spinning, yielding filaments having a tenacity of at least 0.2 gm. per denier, an elastic recovery from 50% extension of at least 78% and a work recovery from 50% extension of at least 40%, and which do not discolor when exposed to a Xenon arc for 300 hours while wound on a frame or bleached for 45 minutes at 85° C. in an aqueous solution having a pH of 4 and containing 0.1% by weight sodium chlorite and 0.5 cc. per liter of glacial acetic acid.

7. Melt spun filaments of the N-substituted copolyamide elastomers claimed in claim 6.

References Cited

UNITED STATES PATENTS

| | | | |
|---|---|---|---|
| 2,378,977 | 6/1945 | Brubaker | 260—78 |
| 2,388,035 | 10/1945 | Frosch | 260—78 |
| 2,430,859 | 11/1947 | Cairns | 260—78 |
| 2,430,866 | 11/1947 | Foster et al. | 260—78 |
| 2,462,430 | 2/1949 | Schneider | 260—78 |
| 2,765,294 | 10/1956 | England | 260—78 |
| 2,835,653 | 5/1958 | Haas et al. | 260—78 |
| 2,892,817 | 6/1959 | Ham | 260—78 |
| 3,027,356 | 3/1962 | Von Schickh | 260—78 |
| 3,036,047 | 5/1962 | Andres | 260—78 |

FOREIGN PATENTS 1,062,118  12/1953  France.

HAROLD D. ANDERSON, Primary Examiner

U.S. Cl. X.R.

128—155, 165; 161—227, 260—29.2, 857; 264—210